United States Patent [19]

Ogawa et al.

[11] 4,006,118
[45] Feb. 1, 1977

[54] FLAME-RETARDANT THERMOPLASTIC POLYMER COMPOSITIONS

[75] Inventors: Yoshikatsu Ogawa, Takatsuki; Takeshi Kasahara, Sakai; Haruhiko Hisada, Yao, all of Japan

[73] Assignees: Marubishi Yuka Kogyo Kabushiki Kaisha; Mitsubishi Petrochemical Company Limited, both of Japan

[22] Filed: May 4, 1973

[21] Appl. No.: 357,189

Related U.S. Application Data

[63] Continuation-in-part of Ser. No. 264,778, June 21, 1972, abandoned.

[30] Foreign Application Priority Data

July 28, 1971 Japan .............................. 46-56044
Oct. 15, 1971 Japan ............................... 46-80927

[52] U.S. Cl. ................. 260/45.75 B; 260/45.95 G; 260/45.95 C
[51] Int. Cl.² ...................... C08K 5/59; C08K 5/41
[58] Field of Search ............. 260/45.75 B, 45.95 C, 260/45.95 G

[56] References Cited
UNITED STATES PATENTS 3,929,901  12/1975  Darsow ...................... 260/45.95 G

*Primary Examiner*—V. P. Hoke
*Attorney, Agent, or Firm*—Robert E. Burns; Emmanuel J. Lobato; Bruce L. Adams

[57] ABSTRACT

Highly durable flame-retardant thermoplastic polymer compositions contain thermoplastic polymer consisting of an ethylenically unsaturated monomer and from 0.1 to 20%, based on the weight of the thermoplastic polymer, of specific brominated alkoxydiphenyl sulfone derivative of the formula:

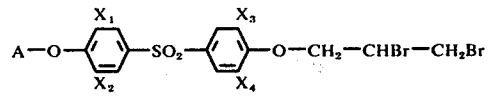

wherein A is a member selected from the group consisting of a hydrogen atom and allyl, propyl and 2,3-dihalogenopropyl groups, and $X_1$, $X_2$, $X_3$ and $X_4$ are members selected from the group consisting of chlorine and bromine atoms with at least two of them being bromine atoms.

10 Claims, No Drawings

FLAME-RETARDANT THERMOPLASTIC POLYMER COMPOSITIONS

This application is a continuation-in-part of application Ser. No. 264,778, filed June 21, 1972, now abandoned.

This invention relates to flame-retardant thermoplastic polymer compositions and more particularly, relates to flame-retardant compositions comprising a thermoplastic polymer consisting of an ethylenically unsaturated monomer and a flame-retardant agent consisting of a specific brominated alkoxydiphenyl sulfone derivative.

It is well-known that the thermoplastic polymer consisting of ethylenically unsaturated monomers such as polyethylene, polypropylene, polystyrene, polyvinyl acetate, polyacrylonitrile and polyacrylic ester have not only high tenacity, low specific gravity, and excellent water-resistance, chemical-resistance and electric insulation, but high processability in molding or shaping. Therefore, they are widely used as material for building parts, household articles and electrical appliances, or as a supplementary material thereof. Thermoplastic polymers consisting of ethylenically unsaturated monomers, however, have the drawback of high inflammability which restricts the scope of use thereof.

Numerous methods have been developed for rendering thermoplastic polymers flame-retardant. Among the flame-retarding methods used to date, methods in which flame-retardance is imparted by the addition of halogenated compounds and antimony oxides as flame-retardant agents into the polymers have been the most widely used. However, these methods require the mixing of very large amounts of the flame-retardant agents in order to render the thermoplastic polymers flame-retardant and, therefore, they have the disadvantages of lowering the physical properties, for example, strength, whiteness, brilliance, electric insulation, etc., of the resultant compositions. For the above reasons, these flame-retarding methods cannot be used practically in most cases. Additionally, in the case of using liquid flame-retardant agents, these materials have the following disadvantages: the agents included in the polymers ooze out onto the surface of the resultant compositions gradually with lapse of time so as to render the surface adhesive and these exuded flame-retardant agents fall off the compositions so as to reduce the flame-retarding effect. This oozing-out phenomenon is also observed in well-known solid flame-retardant agents which have low miscibility with thermoplastic polymers.

These oozing-out and falling-off phenomena are accentuated at higher temperatures. Therefore, in order to render the thermoplastic polymer materials, to be exposed the high temperature, flame-retardant, it is required that they should be mixed with very large amounts of the flame-retardant agents. However, the effects of the resultant compositions have short life-spans.

It is an object of this invention to provide flame-retardant thermoplastic polymer compositions which are excellent in flame-retardance and durability.

It is a further object of this invention to provide flame-retardant thermoplastic polymer compositions which comprise a small amount of a flame-retardant agent and have an excellent flame-retardance.

It is a still further object of this invention to provide flame-retardant thermoplastic polymer compositions which comprise a flame-retardant agent affecting only slightly the properties of the polymers.

The objects can be achieved by the compositions according to the present invention.

The compositions according to this invention are flame-retardant thermoplastic polymer compositions comprising at least one thermoplastic polymer consisting of an ethylenically unsaturated monomer and from 0.1 to 20%, preferably from 1 to 15%, based on the weight of the thermoplastic polymer, of at least one specific brominated alkoxydiphenyl sulfone derivative of the formula (I):

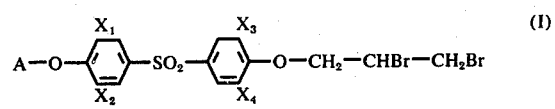

wherein A is a member selected from the group consisting of a hydrogen atom and allyl, propyl, 2,3-dichloropropyl and 2,3-dibromopropyl groups, and $X_1$, $X_2$, $X_3$ and $X_4$ are members selected from the group consisting of chlorine and bromine atoms with at least two of them being bromine atoms.

Specific brominated alkoxydiphenyl sulfones having the structure of the above formula (I) are compounds within a very limited scope. This is known as a result of a careful study regarding the flame-retardant properties of many brominated hydrocarbon sulfones. These compounds are excellent in all of the properties, i.e. flame-retardant effect, durability of flame-retardant effect and maintainability of the desired properties characteristic to the base polymer, which are required for the flame-retardant agent for the thermoplastic polymers and which are not obtained with known flame-retardant agents. The above-mentioned facts have been found and thereby, this invention has been accomplished.

Brominated hydrocarbon compounds outside of the scope of this invention, having a structure of the formula (I) wherein $-SO_2-$ is replaced by $-C(CH_3)_2-$, are poor when an attempt is made to use them practically. This is because these compounds are inferior in miscibility with the thermoplastic polymer and, therefore, ooze out and fall off from the resultant composition. However, such compounds do have a superior flame-retardant effect.

Compounds having a structure of the formula (I) wherein the 2,3-dibromopropoxy group is replaced by hydroxyl, alkoxy or 2,3-dichloropropoxy group do not have such superior flame-retardant effect as displayed by the compounds according to the invention. However, such compounds to render the thermoplastic polymer flame-retardant to some extent.

Also, compounds of the formula (I) wherein all of $X_1$, $X_2$, $X_3$ and $X_4$ are chlorine atoms do not have such superior flame-retardant effect as displayed by the present compounds.

The composition of this invention may comprise antimony oxides, for example, preferably from 0.1 to 20%, based on the weight of the polymer, of diantimony trioxide as well as the above-mentioned thermoplastic polymers and specific brominated alkoxydiphenyl sulfone derivatives and in this case, the specific brominated alkoxydiphenyl sulfone derivatives can be included in small quantity in the compositions.

It has been found that the specific brominated alkoxydiphenyl sulfone derivatives have excellent miscibility with thermoplastic polymer, and can render the thermoplastic polymers extremely flame-retardant even by the addition of small amounts and, moreover, even if the thermoplastic polymer compositions containing them are exposed to high temperature for a long time, they do not ooze out or fall off the surface of the polymer materials to any appreciable extent. Accordingly, the compositions of this invention have the special merit that their flame-retardant properties do not change greatly with the lapse of time.

Thermoplastic polymers usable for the compositions of this invention may be selected from homopolymers or copolymers of ethylenically unsaturated monomers of the formula (II):

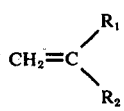
(II)

wherein $R_1$ is a member selected from the group consisting of —H, —$CH_3$, —$C_2H_5$, —$C_3H_7$, —CH=$CH_2$, —COOH, —$COOCH_3$, —CN, —Cl, —NCO, —$C_6H_5$, —$OCOCH_3$ and —OH; and $R_2$ is a member selected from the group consisting of —H, —$CH_3$, —$COOCH_3$ and —Cl, and mixtures of two or more of the polymers. These polymers may optionally comprise unsaturated dicarboxylic acids, for example, maleic acid and fumaric acid, copolymerized with the above monomers.

The names of the compounds corresponding to the above $R_1$ and $R_2$ are indicated in Table 1.

Table 1

| $R_1$ \ $R_2$ | —H | —$CH_3$ | —$COOCH_3$ | —Cl |
|---|---|---|---|---|
| —H | ethylene | | | |
| —$CH_3$ | propylene | isobutylene | | |
| —$C_2H_5$ | 1-butene | | | |
| —$C_3H_7$ | 1-pentene | | | |
| —CH=$CH_2$ | 1,3-butadiene | | | |
| —COOH | acrylic acid | methacrylic acid | | |
| —$COOCH_3$ | methyl acrylate | methyl methacrylate | | |
| —CN | acrylonitrile | methacrylonitrile | α-cyano acrylate | |
| —Cl | vinyl chloride | 2-chloropropene | α-chloro acrylate | vinylidene chloride |
| —NCO | vinyl isocyanate | isopropenyl isocyanate | | |
| —$C_6H_5$ | styrene | α-methyl styrene | | α-chloro styrene |
| —$OCOCH_3$ | vinyl acetate | isopropenyl acetate | | |
| —OH | vinyl alcohol | | | |

Additionally, these thermoplastic polymers may include stabilizers, colorants, weather-proofing agents (ultraviolet ray absorbing agents), delustering agents, antistatic agents, extenders, other flame-retardant agents and other additives.

Among the specific brominated alkoxydiphenyl sulfone derivatives usable for the compositions of this invention, the principal compounds comprise those having the structural formulae:

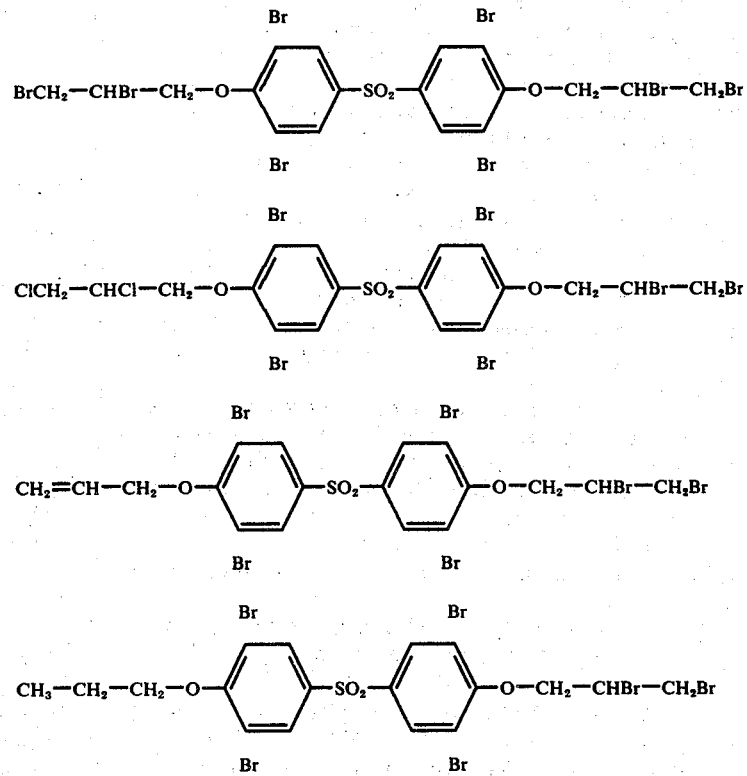

-continued

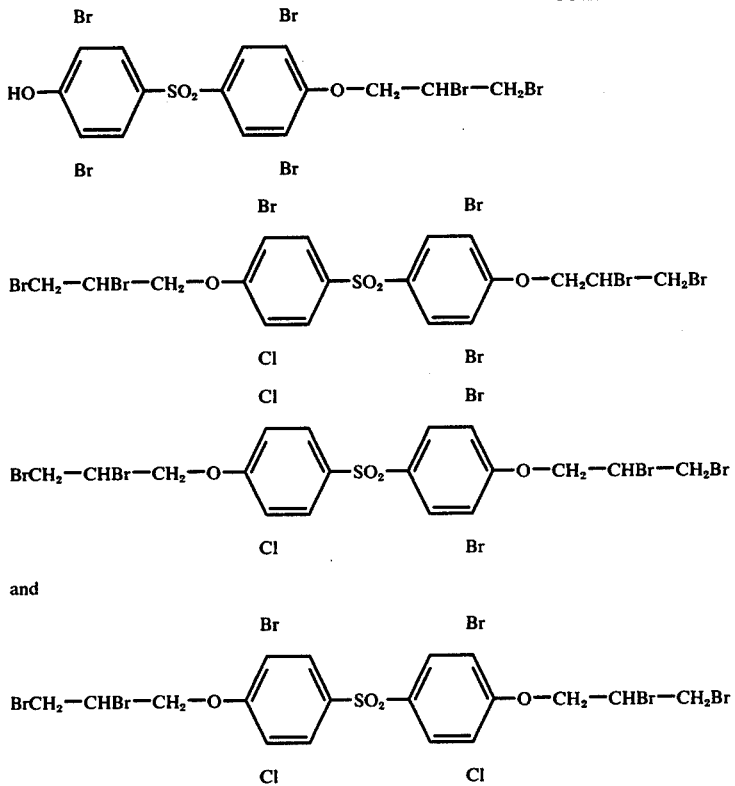

and

The specific brominated alkoxydiphenyl sulfone derivatives may be used in the compositions of this invention separately or as mixtures thereof.

The compositions according to this invention include from 0.1 to 20%, based on the weight of thermoplastic polymer, of specific brominated alkoxydiphenyl sulfone derivatives. If the compositions include less than 0.1% of the flame-retardant agents, their flame-retarding properties are inadequate, and if they include more than 20% of the agents, the flame-retarding effects are lowered and, moreover, the properties, especially the strength of the resultant compositions, are reduced.

In order to produce the compositions of this invention, the usual processes for blending and polymerization can be used. Thermoplastic polymer powders or pellets and specific brominated alkoxydiphenyl sulfone derivatives are mixed and, thereafter, the mixtures are melted and blended by means of a kneader or screw type extruder, Bumbury's mixer, roll mill, etc. Alternatively specific brominated alkoxydiphenyl sulfone derivatives are dissolved into ethylenically unsaturated monomers and then they are polymerized.

The compositions of this invention can be formed into any shape such as film, tape, ribbon, plate, tube, pipe, fiber and filament, and the like and the materials formed may be used as materials for building or for electrical appliances interior articles, clothing, and other sundry goods.

The features of the flame-retardant compositions of this invention will be more distinctly illuminated by the following examples, wherein combustion tests were made according to the method of ASTM D635-56T and the Oxygen Index Method (ASTM D2863-70).

EXAMPLE 1

Bisdibromopropyl ether of 3,5,3',5'-tetrabromo-4,4'-dihydroxydiphenyl sulfone 250 g of 4,4'-dihydroxydiphenyl sulfone was dissolved in a mixture of 800 g of methanol and 150 g of water and then the solution was subjected to the reaction with 640 g of bromine at a temperature of below 40° C to produce 3,5,3',5'-tetrabromo-4,4'-dihydroxydiphenyl sulfone. The reaction was effected substantially quantitatively and a product having a melting point of 261° to 267° C precipitated.

566 g of 3,5,3',5'-tetrabromo-4,4'-dihydroxydiphenyl sulfone thus obtained was mixed with 500 g of methanol, 300 g of water and 80 g of sodium hydroxide and dissolved uniformly. 250 g of allyl bromide was added to the solution and then they were subjected to the reaction at a temperature of from 55° to 65° C for three hours under the refluction. Thus viscously resinous precipitates having bis-allyl ether of 3,5,3',5'-tetrabromo-4,4'-dihydroxydiphenyl sulfone for their main ingredients were obtained. The precipitates were then washed with methanol and dried under a reduced pressure.

215 g of bisallyl ether of 3,5,3',5'-tetrabromo-4,4'-dihydroxydiphenyl sulfone was dissolved in 600 g of methylene chloride and the solution was then subjected to the reaction with 107 g of bromine at a temperature of the boiling point of methylene chloride. After the reaction, the mixture was washed with water, with aqueous solution of 0.5% sodium dicarbonate and finally with water and then methylene chloride was evaporated off. A solid product having a melting point of 58° to 70° C was obtained. The product was found bisdibromopropyl ether of 3,5,3',5'-tetrabromo-4,4'-dihydroxydiphenyl sulfone by ultimate analysis.

15 parts by weight of finely divided flame-retardant agent thus obtained was blended with 100 parts by weight of polyethylene usable for shaped articles by means of a roll mill at 160° to 170° C and pressed at 190° C to form a flat board of 3 mm thickness. The board burned in contact with a flame but the fire went out spontaneously immediately after being removed from the flame. Even after the board was heated at 100° C for a week, since the loss of the flame-retardant agent in the board was 7% or less, the flame-retarding property of the board was not altered substantially and, therefore, the board thus heated was self-extinguishable.

EXAMPLE 2

Bisdibromopropyl ether of 3,5,3',5'-tetrabromo-4,4'-dihydroxydiphenyl sulfone 5 parts by weight of finely divided flame-retardant agent prepared as described in Example 1, 2.5 parts by weight of diantimony trioxide and 100 parts by weight of polyethylene usable for shaped articles were blended by means of a roll mill at 160° to 170° C, pressed at 190° C to form a flat board having 3 mm of thickness. The board burned weakly in contact with a flame but the fire went out spontaneously immediately upon being removed from the flame. Even after the board was heated at 100° C for a week, since the loss of the flame-retardant agent in the board was 7% or less, the flame-retarding property of the board was not altered substantially and, therefore, the board thus heated was self-extinguishable.

EXAMPLE 3

Bisdibromopropyl ether of 3,5,3',5'-tetrabromo-4,4'-dihydroxydiphenyl sulfone 15 parts by weight of finely divided flame-retardant agent prepared as described in Example 1 and 100 parts by weight of polypropylene usable for shaped articles were blended by means of a roll mill at 170° to 180° C and pressed at 200° C to form a flat board having 3 mm of thickness. The board burned in contact with a flame but the fire went out spontaneously immediately after being removed from the flame. Even after the board was heated at 100° C for a week, since the loss of the flame-retardant agent in the board was 7% or less, the flame-retarding property of the board was not altered substantially and, therefore, the board thus heated was self-extinguishable.

EXAMPLE 4

Bisdibromopropyl ether of 3,5,3',5'-tetrabromo-4,4'-dihydroxydiphenyl sulfone 3 parts by weight of finely divided flame-retardant agent prepared as described in Example 1, 1.5 parts by weight of diantimony trioxide and 100 parts by weight of polypropylene usable for shaped articles were blended by means of a roll mill at 170° to 180° C and pressed at 200° C to form a flat board having 3 mm of thickness. The board burned in contact with a flame but the fire went out spontaneously immediately after being removed from the flame. Even after the board was heated at 100° C for a week, since the loss of the flame-retardant agent in the board was 7% or less, the flame-retarding property of the board was not altered substantially and, therefore, the board thus heated was self-extinguishable.

EXAMPLE 5

Bisdibromopropyl ether of 3,5,3',5'-tetrabromo-4,4'-dihydroxydiphenyl sulfone 5 parts by weight of finely divided flame-retardant agent prepared as described in Example 1 and 100 parts by weight of commercial polystyrene pellets were blended by means of a roll mill at 160° to 170° C and pressed at 180° to 190° C (pressure of 50 kg/cm$^2$) to form a flat board of 3 mm thickness. The board burned weakly in contact with a flame but the fire went out spontaneously immediately after being removed from the flame. The oxygen index was 24.1. But a control specimen not containing any flame-retardant agent burned completely and the oxygen index was 19.0.

EXAMPLE 6

Bisdibromopropyl ether of 3,5,3',5'-tetrabromo-4,4'-dihydroxydiphenyl sulfone 10 parts by weight of the flame-retardant agent prepared as described in Example 1, 5 parts by weight of diantimony trioxide and 100 parts by weight of acrylonitrile butadiene styrene (A.B.S.) polymer powder were blended by means of roll mill at 170° to 180° C and pressed at 190° to 200° C (pressure of 50 kg/cm$^2$) to form a flat board of 3 mm thickness. The board burned weakly in contact with a flame but the fire went out spontaneously immediately after being removed from the flame. The oxygen index was 26.0. But a control specimen not containing any flame-retardant agent burned completely and the oxygen index was 19.7.

EXAMPLE 7

Bisdibromopropyl ether of 3,5,3',5'-tetrabromo-4,4'-dihydroxydiphenyl sulfone 5 parts by weight of the flame-retardant agent prepared as described in Example 1 was dissolved in 100 parts by weight of styrene monomer and the solution was subjected to the polymerization with benzoyl peroxide at 100° C to form a bar of 10 mm diameter. The bar burned weakly in contact with a flame but the fire went out spontaneously immediately after being removed from the flame. The oxygen index was 24.0. But a control specimen not containing any flame-retardant agent burned completely and the oxygen index was 18.9.

EXAMPLE 8

Bisdibromopropyl ether of 3,5,3',5'-tetrabromo-4,4'-dihydroxydiphenyl sulfone 5 parts by weight of the flame-retardant agent prepared as described in Example 1, 45 parts by weight of dioctylphthalate and 2 parts by weight of stabilizers (1.5 parts by weight of dibutyltin laurate, 0.3 parts by weight of cadmium stearate and 0.2 parts by weight of barium stearate) were added to 100 parts by weight of polyvinyl chloride (P.V.C.) powder. The mixture was blended by means of a roll mill at 160° C and pressed to form a sheet of 3 mm thickness. The sheet burned weakly in contact with a flame but the fire went out spontaneously immediately after being removed from the flame and the oxygen index was 34. The oxygen index in a control specimen not containing any flame-retardant agent was 26.

EXAMPLE 9

Bisdibromopropyl ether of 3,5,3',5'-tetrabromo-4,4'-dihydroxydiphenyl sulfone 10 parts by weight of the flame-retardant agent prepared as described in Example 1, 5 parts by weight of diantimony trioxide and 100 parts by weight of acrylonitrile styrene (A.S.) polymer powder were blended by a roll mill at 160° to 170° C and pressed at 180° to 190° C to form a flat board of 3 mm thickness. The board burned weakly in contact with a flame but the fire went out spontaneously immediately after being removed from the flame and the oxygen index was 25. The oxygen index in a control specimen not containing any flame-retardant agent was 19.5.

EXAMPLE 10

Bisdibromopropyl ether 3,5,3',5'-tetrabromo-4,4'-dihydroxydiphenyl sulfone 5 parts by weight of the flame-retardant agent prepared as described in Example 1 was dissolved in 200 parts by weight of 50% solution of polyvinyl acetate in ethyl acetate, 2.5 parts by weight of diantimony trioxide was dispersed uniformly in the solution and then the mixture was introduced in a Petri dish and ethyl acetate was evaporated to prepare a sheet of 2 mm thickness. The sheet burned weakly in contact with a flame but the fire went out spontaneously immediately after being removed from the flame. A control specimen not containing any flame-retardant agent burned completely.

EXAMPLE 11

Bisdibromopropyl ether of 3,5,3',5'-tetrabromo-4,4'-dihydroxydiphenyl sulfone 8 parts by weight of the flame-retardant agent prepared as described in Example 1 was dissolved in a mixture of 80 parts by weight of styrene monomer and 20 parts by weight of methacrylic methyl monomer and the solution was subjected to the polymerization with benzoyl peroxide at 70° to 130° C to form a bar of 10 mm diameter. The bar burned weakly in contact with a flame but the fire went out spontaneously immediately after being removed from the flame and the oxygen index was 24. A control specimen not containing any flame-retardant agent burned completely and the oxygen index was 18.5.

EXAMPLE 12

3,5,3',5'-Tetrabromo-4-dibromopropyloxy-4'-dichloropropyloxydiphenyl sulfone 215 g of bisallyl ether of 3,5,3',5'-tetrabromo-4,4'-dihydroxydiphenyl sulfone prepared as described in Example 1 was dissolved in 600 g of methylene chloride and the solution was subjected to the reaction with 53 g of bromine and then saturated and reacted with chlorine gas. After the reaction, the mixture was washed with water, then with an aqueous solution of 0.5% sodium bicarbonate and finally with water and thereafter methylene chloride was evaporated off. A solid product was obtained. This product had 3,5,3',5'-tetrabromo-4-dibromopropyloxy-4'-dichloropropyloxydiphenyl sulfone for its main ingredients.

5 parts by weight of the product thus obtained, 2.5 parts by weight of diantimony trioxide and 100 parts by weight of polyethylene were blended by a roll mill at 160° to 170° C and pressed at 190° C to form a flat board of 3 mm thickness. The board burned in contact with a flame but the fire went out spontaneously immediately after being removed from the flame. Even after the board was heated at 100° C for a week, since the loss of the flame-retardant agent in the board was 5% or less, the flame-retarding property of the board was not altered substantially and, therefore, the board thus heated was self-extinguishable.

EXAMPLE 13

3,5,3',5'-Tetrabromo-4-dibromopropyloxy-4-dichloropropyloxydiphenyl sulfone 10 parts by weight of the flame-retardant agent prepared as described in Example 12, 5 parts by weight of diantimony trioxide and 100 parts by weight of A.B.S. polymer powder were blended by a roll mill at 170° to 180° C and pressed at 190° to 200° C to form a flat board of 3 mm thickness. The board burned weakly in contact with a flame but the fire went out spontaneously immediately after being removed from the flame. The oxygen index was 26.1. A control specimen not containing any flame-retardant agent burned completely and the oxygen index was 20.

EXAMPLE 14

Partial bromination product of bisallyl ether of 3,5,3',5'-tetrabromo-4,4'-dihydroxydiphenyl sulfone 215 g of bisallyl ether of 3,5,3',5'-tetrabromo-4,4'-dihydroxydiphenyl sulfone prepared as described in Example 1 was dissolved in 600 g of methylene chloride and the solution was subjected to the reaction with 53 g of bromine. After the reaction, the mixture was washed with water, then with an aqueous solution of 0.5% sodium bicarbonate and then with water and, thereafter, methylene chloride was evaporated. A solid product was thus obtained. The product had partial bromination product of bisallyl ether of 3,5,3',5'-tetrabromo-4,4'-dihydroxydiphenyl sulfone for its main ingredients.

6 parts by weight of the product thus obtained, 3 parts by weight of diantimony trioxide and 100 parts by weight of polypropylene usable for shaped articles were blended by a roll mill at 170° to 180° C, pressed at 200° C and, thereby, molded into a flat board of 3 mm thickness. The board burned in contact with a flame but the fire went out spontaneously immediately after being removed from the flame. Even after the board was heated at 100° C for a week, since the loss of the flame-retardant agent in the board was 5% or less, the flame-retarding property of the board was not altered substantially and, therefore, the board thus heated was self-extinguishable.

EXAMPLE 15

Partial bromination product of bisallyl ether of 3,5,3',5'-tetrabromo-4,4'-dihydroxydiphenyl sulfone 6 parts by weight of the flame-retardant agent prepared as described in Example 14 and 100 parts by weight of polystyrene pellets were blended by a roll mill at 160° to 170° C and pressed at 180° to 190° C to form a flat board of 3 mm thickness. The board burned weakly in contact with a flame but the fire went out spontaneously immediately after being removed from the flame. The oxygen index was 24. A control specimen not containing any flame-retardant agent burned completely and the oxygen index was 19.0.

EXAMPLE 16

Bisdibromopropyl ether of tribromomonochloro-4,4'-dihydroxydiphenyl sulfone 250 g of 4,4'-dihydroxydiphenyl sulfone was dissolved in a mixture of 800 g of methanol and 150 g of water and the solution was allowed to react with 71 g of chlorine at a temperature of below 40° C, and then with 480 g of bromine at a temperature of below 50° C. Thus, tribromomonochloro-4,4'-dihydroxydiphenyl sulfone was precipitated.

Tribromomonochloro-4,4'-dihydroxydiphenyl sulfone thus obtained was converted to allyl ether thereof by the process as described in Example 1 and then brominated to prepare bisdibromopropyl ether of tribromomonochloro-4,4'-dihydroxydiphenyl sulfone by the process as described in Example 1.

5 parts by weight of the flame-retardant agent thus obtained, 100 parts by weight of polypropylene and 2.5 parts by weight of diantimony trioxide, were blended and pressed to form a flat board of 3 mm thickness by the method as described in Example 3. The board burned weakly in contact with a flame but the fire went out spontaneously immediately after being removed from the flame. Even after the board was heated at 100° C for a week, since the loss of the flame-retardant agent was 7% or less, the flame-retarding property of the board was not altered substantially and, therefore, the board thus heated was self-extinguishable.

EXAMPLE 17

Bisdibromopropyl ether of tribromomonochloro-4,4'-dihydroxydiphenyl sulfone 100 parts by weight of polystyrene pellets, 5 parts by weight of the flame-retardant agent prepared as described in Example 16 were blended by a roll mill at 160° to 170° C and presssed at 180° to 190° C (pressure of 50 kg/cm²) to form a flat board of 3 mm thickness. The board burned weakly in contact with a flame but the fire went out spontaneously immediately after being removed from the flame. The oxygen index was 24.3. A control specimen not containing any flameretardant agent burned completely and the oxygen index was 19.0.

EXAMPLE 18

Bisdibromopropyl ether of 3,5,3',5'-tetrabromo-4,4'-dihydroxydiphenyl sulfone prepared as described in Example 1 was blended with polyethylene usable for shaped articles and then the mixture was molded. The tensile strength and the combustibility of the molded materials were determined. The results are shown in Table 2.

Table 2

| Composition (%) | | | |
|---|---|---|---|
| Polyethylene | 100 | 90 | 94 |
| Flame-retardant agent | — | 10 | 4 |
| Diantimony trioxide | — | — | 2 |

Table 2-continued

| Property | | | |
|---|---|---|---|
| Tensile strength (kg/cm²) | 303 | 310 | 306 |
| Combustibility | highly flammable | self-extinguishable | highly self-extinguishable |

EXAMPLE 19

Bisdibromopropyl ether of 3,5,3',5'-tetrabromo-4,4'-dihydroxydiphenyl sulfone prepared as described in Example 1 was blended with polypropylene usable for shaped articles, and then the mixture was molded. The properties of the molded materials were determined. The results are shown in Table 3.

Table 3

| Composition (%) | | | |
|---|---|---|---|
| Polypropylene | 100 | 90 | 94 |
| Flame-retardant agent | — | 10 | 4 |
| Diantimony trioxide | — | — | 2 |
| Property | | | |
| Tensile strength (kg/cm²) | 350 | 330 | 340 |
| Combustibility | highly flammable | self-extinguishable | highly self-extinguishable |

EXAMPLE 20

For comparison with flame-retardant agents used in the prior art, polyethylene, polypropylene and polystyrene were blended with various flame-retardant agents and diantimony trioxide to form flat boards of 3 mm thickness, respectively. The blending and molding were carried out in the case of polyethylene by the method as described in Example 1, in the case of polypropylene by the method as described in Example 3 and in the case of polystyrene by the method as described in Example 5. The combustibility of these boards was determined after molding and after heat treatment in an atmosphere at 100° C. Also, the loss of the flame-retardant agents in the boards was determined after heat treatment in an atmosphere at 100° C for a week. The results are shown in Table 4.

As is evident from Table 4, halogenated phenyl sulfones being outside the scope of this invention did not have such superior flame-retardant effect, in small amounts, as displayed by the flame-retardant agents according to the invention. However, the halogenated phenyl sulfones did have flame-retardant effect in large amounts.

The known flame-retardant agents other than sulfones were inadequate in flame-retardant effect with the exception of tetrabromobutane and bisdibromopropyl ether of tetrabromo-bisphenol A. The boards containing tetrabromobutane and bis-dibromopropyl ether of tetrabromobisphenol A were excellent in flame-retardance but very inferior in durability of the flame-retardance.

On the other hand, the flame-retardant agents according to the invention were excellent in both flame-retardant effect and durability of flame-retardant effect.

Table 4

| Base Polymer | Flame-retardant agent | (parts) | Di-antimony trioxide (parts) | Combustibility After molding | Combustibility After heat treatment (100° C) | Loss of flame-retardant agent(%) after heat treatment (100° C, 1 week) |
|---|---|---|---|---|---|---|
| Poly-ethylene (100 parts) | Compound in Example 1 | 4 | 2 | self-extinguishable | self-extinguishable (after 6 months) | 7 or less |
| | 3,3',5,5'-tetrabromo-4,4'-dihydroxydiphenyl sulfone | 15 | 7.5 | flammable | — | 10 or less |
| | | 20 | 10 | self-extinguishable | — | — |
| | Bisdibromopropyl ether of 3,3',5,5'-tetrachloro-4,4'-dihydroxydiphenyl sulfone | 8 | 4 | flammable | — | 7 or less |
| | | 12 | 6 | self-extinguishable | — | — |
| | (Phenylsulfonyl)-dibromoacetonitrile | 10 | 5 | flammable | — | 70 |
| | | 15 | 7.5 | self-extinguishable | flammable (after 1 week) | — |
| | 2-chloroethyl-p-chlorophenyl sulfone | 20 | 10 | flammable | — | 75 |
| | Hexabromobenzene | 15 | 7.5 | flammable | — | 35 |
| | | 25 | 12.5 | self-extinguishable | flammable (after 2 weeks) | — |
| | Diphenyl bromide (Br: 70 wt.%) | 15 | 7.5 | flammable | — | 90 |
| | | 25 | 12.5 | self-extinguishable | flammable (after 1 week) | — |
| | Bisdibromopropyl ether of tetrabromo bisphenol A | 5 | 2.5 | self-extinguishable | flammable (after 1 month) | 25 |
| | Tegrabromobutane | 5 | 2.5 | self-extinguishable | flammable (after 1 week) | 95 |
| Poly-pro-pylene (100 parts) | Compound in Example 1 | 3 | 1.5 | self-extinguishable | self-extinguishable (after 6 months) | 7 or less |
| | 3,3',5,5'-tetrabromo-4,4'-dihydroxydiphenyl sulfone | 10 | 5 | flammable | — | 10 or less |
| | | 15 | 7.5 | self-extinguishable | — | — |
| | Bisdibromopropyl ether of 3,3',5,5'-tetrachloro-4,4'-dihydroxydiphenyl sulfone | 6 | 3 | flammable | — | 7 or less |
| | | 10 | 5 | self-extinguishable | — | — |
| | (Phenylsulfonyl)-dibromoacetonitrile | 8 | 4 | flammable | — | 65 |
| | | 12 | 6 | self-extinguishable | flammable (after 1 week) | — |
| | 2-chloroethyl-p-chlorophenyl sulfone | 20 | 10 | flammable | — | 70 |
| | Hexabromobenezene | 15 | 7.5 | flammable | — | 35 |
| | | 25 | 12.5 | self-extinguishable | flammable (after 2 weeks) | — |
| | Diphenyl bromide (Br: 70 wt.%) | 15 | 7.5 | flammable | — | 85 |
| | | 25 | 12.5 | self-extinguishable | flammable (after 1 week) | — |
| | Bisdibromopropyl ether of tetrabromo bisphenol A | 5 | 2.5 | self-extinguishable | flammable (after 1 month) | 20 |
| | Tetrabromobutane | 5 | 2.5 | self-extinguishable | flammable (after 1 week) | 90 |
| Poly-styrene (100 parts) | Compound in Example 1 | 5 | 0 | self-extinguishable | — | — |
| | 3,3',5,5'-tetrabromo-4,4'-dihydroxydiphenyl sulfone | 15 | 7.5 | flammable | — | — |
| | | 20 | 10 | self extinguishable | — | — |
| | Bisdibromopropyl ether of 3,3',5,5'-tetrachloro-4,4'-dihydroxydiphenyl sulfone | 5 | 2.5 | flammable | — | — |
| | | 8 | 4 | self-extinguishable | — | — |
| | (Phenylsulfony)-dibromoacetonitrile | 6 | 3 | flammable | — | — |
| | | 10 | 5 | self-extinquishable | — | — |
| | 2-chloroethyl-p-chlorophenyl sulfone | 20 | 10 | flammable | — | — |

What we claim is:

1. A flame-retardant thermoplastic polymer composition comprising at least one thermoplastic polymer derived from an ethylenically unsaturated monomer and from 0.1 to 20%, based on the weight of the thermoplastic polymer, of at least one specific brominated alkoxydiphenyl sulfone derivative of the formula (I):

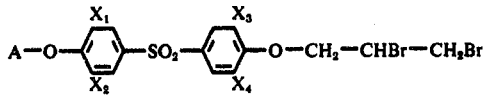

(I)

wherein A is a member selected from the group consisting of a hydrogen atom and allyl, propyl, 2,3-dichloropropyl and 2,3-dibromopropyl groups, and $X_1$, $X_2$, $X_3$ and $X_4$ are members selected from the group consisting of chorine and bromine atoms with at least two of them being bromine atom.

2. A composition as claimed in claim 1, wherein the specific brominated alkoxydiphenyl sulfone derivative is in an amount of from 1 to 15% based on the weight of the thermoplastic polymer.

3. A composition as claimed in claim 1, further comprising from 0.1 to 20% of diantimony trioxide based on the weight of the thermoplastic polymer.

4. A composition as claimed in claim 1, wherein the specific brominated alkoxydiphenyl sulfone derivative is selected from the class consisting of the compounds of the following formulae:

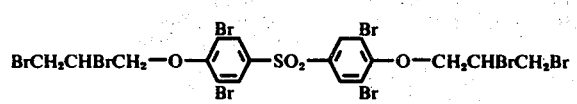

and

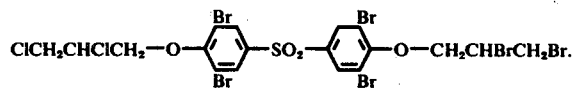

5. A composition as claimed in claim 1, wherein the specific brominated alkoxydiphenyl sulfone derivative is selected from the class consisting of the compounds of the following formulae:

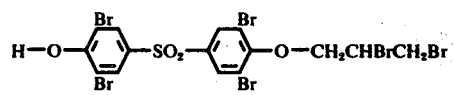

and

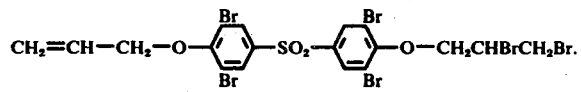

6. A composition as claimed in clain 1, wherein the specific brominated alkoxydiphenyl sulfone derivative is selected from the class consisting of the compounms of the following formulae:

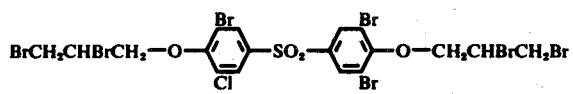

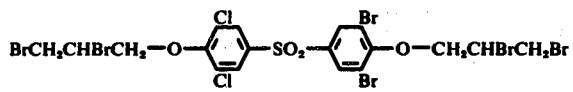

and

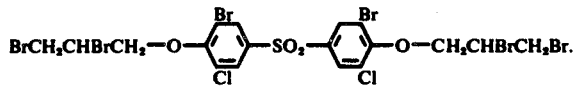

7. A composition as claimed in claim 1, wherein the thermoplastic polymer is selected from the group consisting of polyethylene, polypropylene and ethylene-propylene copolymer.

8. A composition as claimed in claim 1, wherein the thermoplastic polymer is selected from the group consisting of polystyrene, acrylonitrile-butadiene-styrene copolymer, polyvinyl chloride, acrylonitrile-styrene copolymer, polyvinyl acetate and styrene-methylmethacrylate copolymer.

9. A flame retardant composition comprising a mono-olefin polymer and a flame retardant amount of a halogenated alkoxy diphenyl sulfone compound of the formula

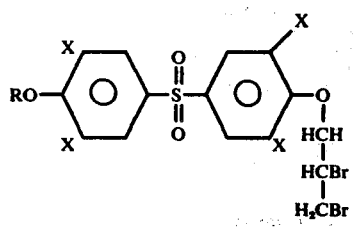

wherein X is chlorine or bromine and R is either 2,3-dibromopropyl or 2,3-dichloro-propyl.

10. A flame-retardant composition according to claim 9 including antimony trioxide.

* * * * *